T. M. FREEBLE.
RAILWAY SIGNALING SYSTEM.
APPLICATION FILED APR. 29, 1911.
1,016,882.
Patented Feb. 6, 1912.
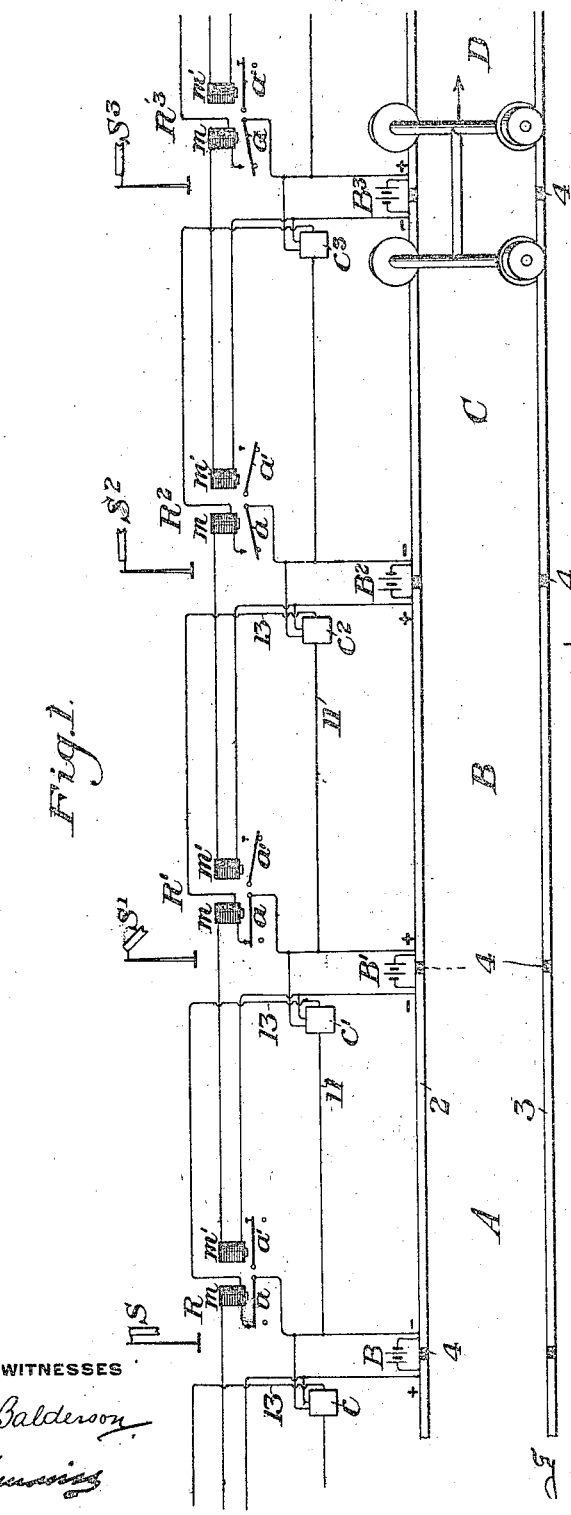
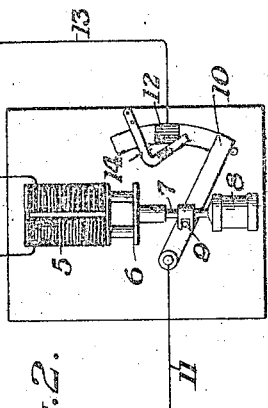
WITNESSES
R. A. Balderson
INVENTOR
Thos. M. Freeble,
by Bakewell, Byrnes & Parmelee,
his Attys.

UNITED STATES PATENT OFFICE.

THOMAS M. FREEBLE, OF ROCHESTER, PENNSYLVANIA, ASSIGNOR OF ONE-HALF TO RAYMOND M. KAUFMANN, OF PITTSBURGH, PENNSYLVANIA.

RAILWAY SIGNALING SYSTEM.

1,016,882.  Specification of Letters Patent.  Patented Feb. 6, 1912.

Application filed April 29, 1911. Serial No. 624,152.

*To all whom it may concern:*

Be it known that I, THOMAS M. FREEBLE, of Rochester, Beaver county, Pennsylvania, have invented a new and useful Improvement in Railway Signaling Systems, of which the following is a full, clear, and exact description, reference being had to the accompanying drawings, forming part of this specification, in which—

Figure 1 is a diagrammatic view illustrating one embodiment of my invention; and Fig. 2 is a detail view showing one of the switch devices or controllers.

My invention has relation to railway signaling systems of the block section type; and is designed to provide a system which, while applicable to railways generally, is particularly adapted for use on railways employing metal ties, since it avoids the necessity for insulating the rails from the ties.

The nature of my invention will be best understood by reference to the accompanying drawings, in which I have shown the preferred embodiment thereof, and which will now be described, it being premised, however, that the particular arrangement of signaling apparatus is illustrative only and that my invention is applicable to various arrangements of signaling devices.

In the drawings, the numerals 2 and 3 designate the track rails of a railway track, which are divided, by means of insulation 4, into a plurality of blocks or sections of any desired length, as indicated at A, B, C and D.

S, S', S², S³ designate semaphores, or other signal devices, which guard respectively the entrance to the blocks A, B, C and D.

R, R', R², R³ designate respectively the relays which control the several semaphores in any well known or usual manner.

B, B', B², B³ designate sources of current supply for the several blocks, and which may consist of simple batteries. Each of these sources of current supply is connected to the rails 2 of adjacent block sections at opposite sides of the insulation 4, the points of connection being closely adjacent to the insulation. The distance between the two terminal connections of each battery with the rails 2 is such that the battery can be short-circuited through the truck of a car or other vehicle having wheels standing at opposite sides of the two connections. The battery connections at the opposite ends of each block are of opposite character, so that the two batteries connected to any one block are caused to oppose each other, and practically no current flows in the track rails 2.

It will be apparent that if signal controlling relays are connected to the batteries, or to the track rails closely adjacent to the batteries, the magnets of these relays will be normally energized by the battery current; but that as soon as a car or other vehicle comes to a position in which its front truck wheels stand at opposite sides of the insulated joints at the entrance to a block, the battery will be short-circuited through the truck wheels and frame and the relay magnets will be deënergized to actuate a signal. Inasmuch as the short-circuiting of the batteries is effected in this manner, and there is no signal current flowing in the rails 2, it will be apparent that if metal ties are employed in the track construction, it is wholly unnecessary to insulate these ties from the track rails. Where metal ties are employed, it is, of course, necessary to divide both track rails 2 and 3 into insulated sections. If the invention were applied to a railway track using wooden ties, the track rails 3 might be used without insulated joints.

My invention is obviously applicable to various arrangements of signals, arranged to be operated by the short-circuiting of the batteries in the manner described. The particular arrangement which I have shown and which will now be described, is illustrative only, and forms no part of my broader claims, although certain features thereof will be specifically claimed.

Each of the relays R, R', R² and R³ consists of two magnets $m$, $m'$. The magnet $m$ of each relay is connected through a movable armature $a$ with the track rail 2 of one block section and is connected on the opposite side to the track rail 2 of the receiving block section, the track connections being made closely adjacent to the battery connections across the insulated joint between said sections. Thus, in the relay R', the magnet $m$ is connected through one side through the armature $a$ to the track rail 2 of the block section B closely adjacent to the connection to said rail of the battery B'; and is connected on the opposite side to the track rail 2 of the block section B closely adjacent to the other track connection of said battery. The magnet $m'$ of the relay R is connected in series with the magnet $m$ in this last named connection; and in every block the relay magnet $m$ at the entrance of the block is connected in series in this manner with the relay magnet $m'$ at the entrance of the preceding block. It will be apparent that as the locomotive or other vehicle comes to a position such as indicated diagrammatically in Fig. 1, in which it short-circuits the battery of any block, corresponding relay magnet $m$ guarding the entrance to that block will be short-circuited and the signal thereby moved to danger. At the same time, the relay magnet $m'$ at the entrance to the preceding block will also be deënergized and drop its armature. In order to provide for the reënergization of the magnets and the proper clearing movements of the signals, I provide in each block a switch or controller $c$, $c'$, $c^2$, $c^3$. This controller may be of various forms. As shown in Fig. 2, it consists of a magnet 5 having its coils connected in shunt across the adjacent battery. The armature 6 of this magnet has a stem 7 extending into dash pot 8, and has an actuating connection 9 with a movable contact lever 10. This contact lever is connected by conductor 11 with the connection leading from the magnet $m$ at the entrance of the block to the track rail 2. The controller also has a fixed contact 12 located in the path of movement of the lever 10, and which is connected by conductor 13 with the relay magnet $m$ at the entrance to the block, it being understood from Fig. 1 that each controller is placed near the exit end of its block.

14 is a guard device, which is so arranged that when the contact lever 10 is released by the magnet 5, it will cause said lever to drop along the outer side of the guard and not engage the contact 12; but when the said lever 10 is raised by the magnet, it will ride underneath this guard and come into momentary engagement with the contact 12, thus completing a circuit through the magnet $m$. At the same time that the locomotive or other vehicle short-circuits the relay magnet $m$, it also short-circuits the controller magnet 5 which is in parallel with the magnet $m$, and thereby drops the lever 10 into the position shown in Fig. 2. As soon as the last truck of the vehicle or train has passed beyond the insulated joint, the magnets 5 are again energized, thereby attracting the lever 10 and causing a circuit to be completed through the magnet $m$ at the entrance of the block which the train or vehicle has just left. At the same time a circuit will be closed through the magnet $m'$ of the preceding block. Thus, supposing a train or vehicle to have just passed out of the block C, the magnet $m$ of the relay $R^2$ and the magnet $m'$ of the relay R' will both be momentarily energized by the action of the controller $c^3$, as just described; and this will cause armatures of said magnets to be attracted and the normal circuit $m$ of the relay $R^2$ to be closed. The action of the magnet $m$ will set the signal $S^2$ at caution position; and the action of the magnet $m'$ will clear the signal $S'$. In this manner, the entrance of the vehicle or train into any block section immediately sets the signal guarding that section at danger. As soon as the last truck of the vehicle or train has passed the insulated joint, the signal guarding the preceding section is set at caution, and the signal guarding the next succeeding section is cleared.

The advantages of my invention will be readily apparent to those skilled in the art, since it obviates the difficulty heretofore experienced with metal ties in properly insulating the ties from the rails. When used with wooden ties on an electrically propelled road, it obviates the employment of induction bonds in the rails 2 for preventing the passage of the signaling current from one block to another, and in such a system the track rail 3 can be made electrically continuous for the propulsion current. The invention is also applicable to electrically propelled roads using metal ties by using signaling current of a distinctive character from the propulsion current, with proper bonding for the propulsion current across the insulated joints. Where the invention is used in connection with metal ties, the block insulations 4 should of course be placed directly opposite each other in the two track rails. My invention further provides a very simple and effective signaling system.

What I claim is:—

1. In a railway signaling system, a track rail divided into insulated sections, a source of signaling current having opposite terminals connected to the respective sections at opposite sides of the insulation and adjacent thereto, and normally closed signal controlling circuits also having their terminals connected to said sections at opposite sides of the insulation, the two sources of current connected to each track section being connected thereto to oppose each other; substantially as described.

2. In a rail signaling system, a track rail divided into sections insulated from each other, and sources of current having their opposite terminals connected to adjacent rails at opposite sides of the separating insulations to be short-circuited by the wheels of a vehicle bridging the insulations, and signal mechanisms connected in normally closed circuits with the sources of current, the said mechanisms being electrically connected with the one divided track rail only, and each section of said rail being connected at both ends to like terminals of the respective sources of current, substantially as described.

3. In a signaling system, a track rail divided into block sections insulated from each other, and a source of current for each block section having its terminals bridging the insulation, the two sources of current connected to each section being arranged to oppose each other; a signal circuit for each block connected to the said track rail at points adjacent to the connections of the source of current, substantially as described.

4. In a railway signaling system, a track rail divided into blocks or sections, sources of current supply each having its terminals connected to the ends of adjacent blocks or sections around the insulation, the two sources connected to each block or section being oppositely connected to thereby oppose each other, and signaling mechanism connected to the said rail adjacent to the points of connection of a source of current and having a normally closed circuit, substantially as described.

5. In a railway signaling system, a track rail having insulated blocks or sections, sources of current each of which has one terminal connected to the rail of one block adjacent to an insulated joint, and its other terminal connected to the corresponding rail of the adjacent block at the other side of the insulated joint, signal-controlling relays each of which has two magnets in series, one of said magnets being located near the entrance to the block and the other near the exit of the block, and having their terminals connected with the source at opposite sides of the insulated joint, and switch devices one of which is connected across each source of current and having contacts which assist in the control of the relay magnet circuits; substantially as described.

6. In a railway signaling system the combination with a divided track rail having insulated joints at the divisions thereof, of a relay magnet connected to the track rail at opposite sides of an insulated joint therein, a switch device connected in parallel with the magnet, and a magnet-energizing circuit controlled by the switch device; substantially as described.

7. In a railway signaling system the combination with a divided track rail having insulated joints at the divisions thereof, of a relay magnet connected to the track rail at opposite sides of an insulated joint therein, a switch device connected in parallel with the magnet, and a magnet-energizing circuit controlled by the switch device, said switch device having a magnet in the parallel connection, a movable contact arranged to be controlled by said magnet, and means whereby said contact device is effectively operative in one direction only of its movement; substantially as described.

8. In a railway signaling system, a track rail having insulated blocks or sections, sources of current each of which has one terminal connected to the rail of one block adjacent to an insulated joint and its other terminal connected to the corresponding rail of the adjacent block at the other side of the insulated joint, a signaling circuit connected to said rail at opposite sides of the insulation and adjacent to the connections of the source of current, and a plurality of signal-controlling magnets in series in said circuit, said magnets being located respectively near the extreme ends of two successive blocks, substantially as described.

9. In a railway signaling system, a track rail having insulated blocks or sections, sources of current each of which has one terminal connected to the rail of one block adjacent to an insulated joint and its other terminal connected to the corresponding rail of the adjacent block at the other side of the insulated joint, a signaling circuit connected to said rail at opposite sides of the insulation and adjacent to the connections of the source of current, and a plurality of signal-controlling magnets in series in said circuit, one of said magnets having its armature in series in said circuit, substantially as described.

In testimony whereof, I have hereunto set my hand.

T. M. FREEBLE.

Witnesses:
A. D. KAUFMANN,
H. M. CORWIN.